US012640656B2

(12) United States Patent
Jabez Dhinagar et al.

(10) Patent No.: US 12,640,656 B2
(45) Date of Patent: May 26, 2026

(54) BI-DIRECTIONAL DC-DC CONVERTER

(71) Applicant: TVS MOTOR COMPANY LIMITED, Chennai (IN)

(72) Inventors: Samraj Jabez Dhinagar, Chennai (IN); Kp Arun, Chennai (IN); Siva Prasad K, Chennai (IN)

(73) Assignee: TVS MOTOR COMPANY LIMITED, Chennai (IN)

( * ) Notice: Subject to any disclaimer, the term of this patent is extended or adjusted under 35 U.S.C. 154(b) by 788 days.

(21) Appl. No.: 17/911,745

(22) PCT Filed: Jul. 29, 2020

(86) PCT No.: PCT/IN2020/050669
§ 371 (c)(1),
(2) Date: Sep. 15, 2022

(87) PCT Pub. No.: WO2021/191917
PCT Pub. Date: Sep. 30, 2021

(65) Prior Publication Data
US 2023/0134008 A1 May 4, 2023

(30) Foreign Application Priority Data
Mar. 24, 2020 (IN) .............................. 202041012871

(51) Int. Cl.
*H02M 3/335* (2006.01)
*H02J 7/00* (2006.01)
(Continued)

(52) U.S. Cl.
CPC ....... *H02M 3/33584* (2013.01); *H02J 7/0013* (2013.01); *H02M 3/33573* (2021.05);
(Continued)

(58) Field of Classification Search
CPC ......... H02M 3/33584; H02M 3/33573; H02M 3/1582; H02M 3/33561; H02J 7/0013;
(Continued)

(56) References Cited

U.S. PATENT DOCUMENTS

| | | | | |
|---|---|---|---|---|
| 2019/0148973 A1* | 5/2019 | Kim | ........................ | H02J 7/06 320/109 |
| 2020/0091753 A1 | 3/2020 | Maruyama | | |

(Continued)

FOREIGN PATENT DOCUMENTS

| | | |
|---|---|---|
| CN | 109728624 A | 5/2019 |

OTHER PUBLICATIONS

International Search Report issued in corresponding International Application No. PCT/IN2020/050669 mailed Nov. 17, 2020 (3 pages).

(Continued)

*Primary Examiner* — Paul Dinh
(74) *Attorney, Agent, or Firm* — Osha Bergman Watanabe & Burton LLP

(57) ABSTRACT

A bi-directional DC-DC converter and an on-board charger with the bi-directional DC-DC converter integrated into it are disclosed for converting a first voltage to a second voltage. The bi-directional DC-DC converter includes a transformer for magnetically coupling a primary circuit receiving the first voltage on a primary side with a rectification circuit on a secondary side. Further, a high voltage power source is connected to the rectification circuit for supplying a high voltage to one or more high voltage loads and a low voltage power source is connected to the high voltage power source through a secondary circuit for supplying a second voltage to one or more low voltage loads.

(Continued)

The bi-directional DC-DC converter functions in both stationary condition and running condition of a powered device.

9 Claims, 14 Drawing Sheets

(51) Int. Cl.
    *B60L 53/22*       (2019.01)
    *H02J 7/34*       (2006.01)
    *H02M 3/158*     (2006.01)

(52) U.S. Cl.
    CPC .............. *B60L 53/22* (2019.02); *H02J 7/342*
        (2020.01); *H02J 2207/20* (2020.01); *H02M*
                                  *3/1582* (2013.01)

(58) Field of Classification Search
    CPC ........ H02J 7/342; H02J 2207/20; H02J 1/082;
            B60L 53/22; B60L 2210/10; B60L 58/13;
            B60L 58/20; Y02T 10/70; Y02T 10/7072

USPC ......................................................... 320/107
See application file for complete search history.

(56)                  References Cited

U.S. PATENT DOCUMENTS

2020/0212816 A1*   7/2020   Sun ....................... H02J 7/0018
2020/0412237 A1*  12/2020  Dai ........................ H02M 3/155
2021/0155100 A1*   5/2021   Khaligh ................. B60L 55/00

OTHER PUBLICATIONS

Written Opinion issued in corresponding International Application No. PCT/IN2020/050669 mailed Nov. 11, 2020 (6 pages).

* cited by examiner

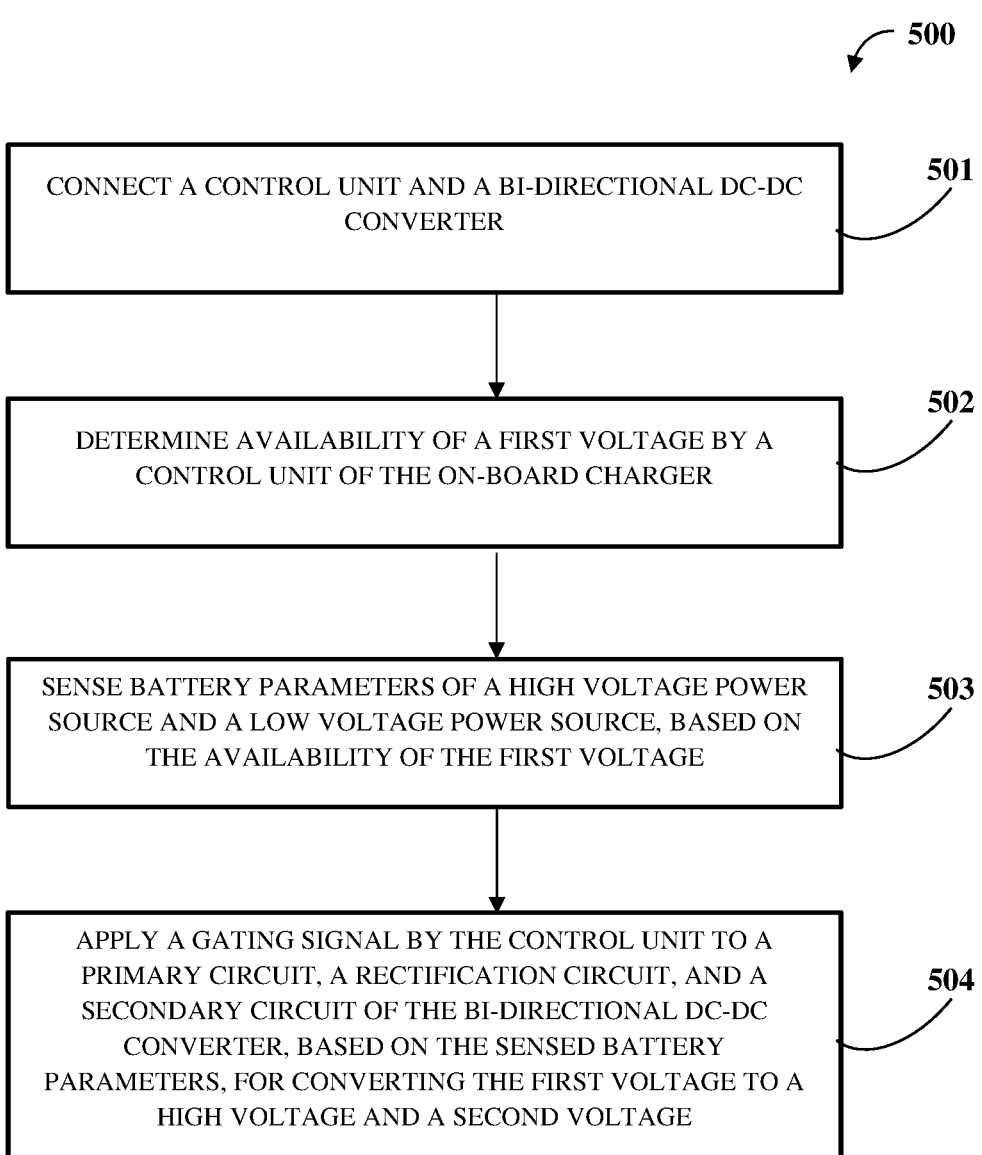

500

CONNECT A CONTROL UNIT AND A BI-DIRECTIONAL DC-DC CONVERTER

501

DETERMINE AVAILABILITY OF A FIRST VOLTAGE BY A CONTROL UNIT OF THE ON-BOARD CHARGER

502

SENSE BATTERY PARAMETERS OF A HIGH VOLTAGE POWER SOURCE AND A LOW VOLTAGE POWER SOURCE, BASED ON THE AVAILABILITY OF THE FIRST VOLTAGE

503

APPLY A GATING SIGNAL BY THE CONTROL UNIT TO A PRIMARY CIRCUIT, A RECTIFICATION CIRCUIT, AND A SECONDARY CIRCUIT OF THE BI-DIRECTIONAL DC-DC CONVERTER, BASED ON THE SENSED BATTERY PARAMETERS, FOR CONVERTING THE FIRST VOLTAGE TO A HIGH VOLTAGE AND A SECOND VOLTAGE

BI-DIRECTIONAL DC-DC CONVERTER

TECHNICAL FIELD

The present subject matter relates to a power supply system. More particularly, a bi-directional DC-DC converter integrated into the power supply system of a powered device.

BACKGROUND

An energy storage device collects and stores energy by charging itself from an electrical power source, and supplies the stored power to the loads by discharging. The charging and the discharging process are to be precisely managed to ensure safe, reliable, and long life of the energy storage device. In most applications, the charging and the discharging function are typically controlled by two separate powertrains to implement the different control targets such as a smaller charge current, smaller discharge current for low voltage electrical loads, and a larger discharge current for high voltage electrical load from the energy storage device. The powertrains comprise electrical and electronic components involved in charging and discharging of the energy storage device.

The powertrains in charging and discharging of the energy storage device include one or more rectifiers to convert AC power supply at the electrical power source to a DC voltage, one or more DC-DC converters to convert the DC voltage to the DC voltages needed by the energy storage device and the high or low voltage electrical loads. The DC-DC converters are unidirectional DC converters where transmission of current is unidirectional and the reverse breaks down or damages the switching devices within the DC-DC converters. However, for compact design of the power supply systems of powered devices, the powertrains need to be combined. Also, the combined powertrain needs to cater for rapid charging and discharging of the energy storage device using the DC-DC converters.

BRIEF DESCRIPTION OF THE DRAWINGS

The detailed description is described with reference to the accompanying figures. The same numbers are used throughout the drawings to reference like features and components.

FIG. 5 exemplarily illustrates a flowchart depicting a method for converting a first voltage to a second voltage in the on-board charger;

DETAILED DESCRIPTION OF THE INVENTION

By combining the powertrains for charging and discharging of the energy storage device, a compact design of the power supply system with reduced cost may be achieved. However, one DC-DC converter that is bi-directional is needed to cater to both the charging of the energy storage device from the power source and the discharging of the energy storage device to supply the low voltage and high voltage loads in a combined powertrain. Thus, there exists a need for a bi-directional DC-DC converter that eliminates multiple DC-DC converters and operates seamlessly and efficiently both during the charging as well as the discharging cycles of the energy storage device in a power supply system.

Few examples of the power supply systems of powered devices employing DC-DC converters are chargers, photovoltaic systems, battery backup systems, or any power distribution system. The chargers may be charger of a laptop or a cellphone, an on-board/offline charger of a vehicle, etc. The on-board charger may be required in powered devices, such as, an electric vehicle or a hybrid electric vehicle.

Electric vehicles or hybrid electric vehicles have gained popularity in recent years as the potential replacement for internal combustion vehicles, since they have zero emission from electric drive system, and does not have oil dependency. The hybrid electric vehicles are configured to be powered either by an internal combustion engine or electric motor or both. The electric vehicles have rechargeable battery modules as the power source of the vehicle. These rechargeable battery modules are charged using AC chargers and separate DC/DC converters. There are many low voltage loads in the electric vehicles powered by the rechargeable battery modules. These low voltage loads have low voltage rating typically between 5V to 12V. The sourced voltage from the battery modules needs to be further stepped down to power such low voltage loads. In some existing implementations, separate DC-DC converters, for stepping-down the voltage to supply lower voltage loads, are integrated with the AC chargers.

Figure 1:
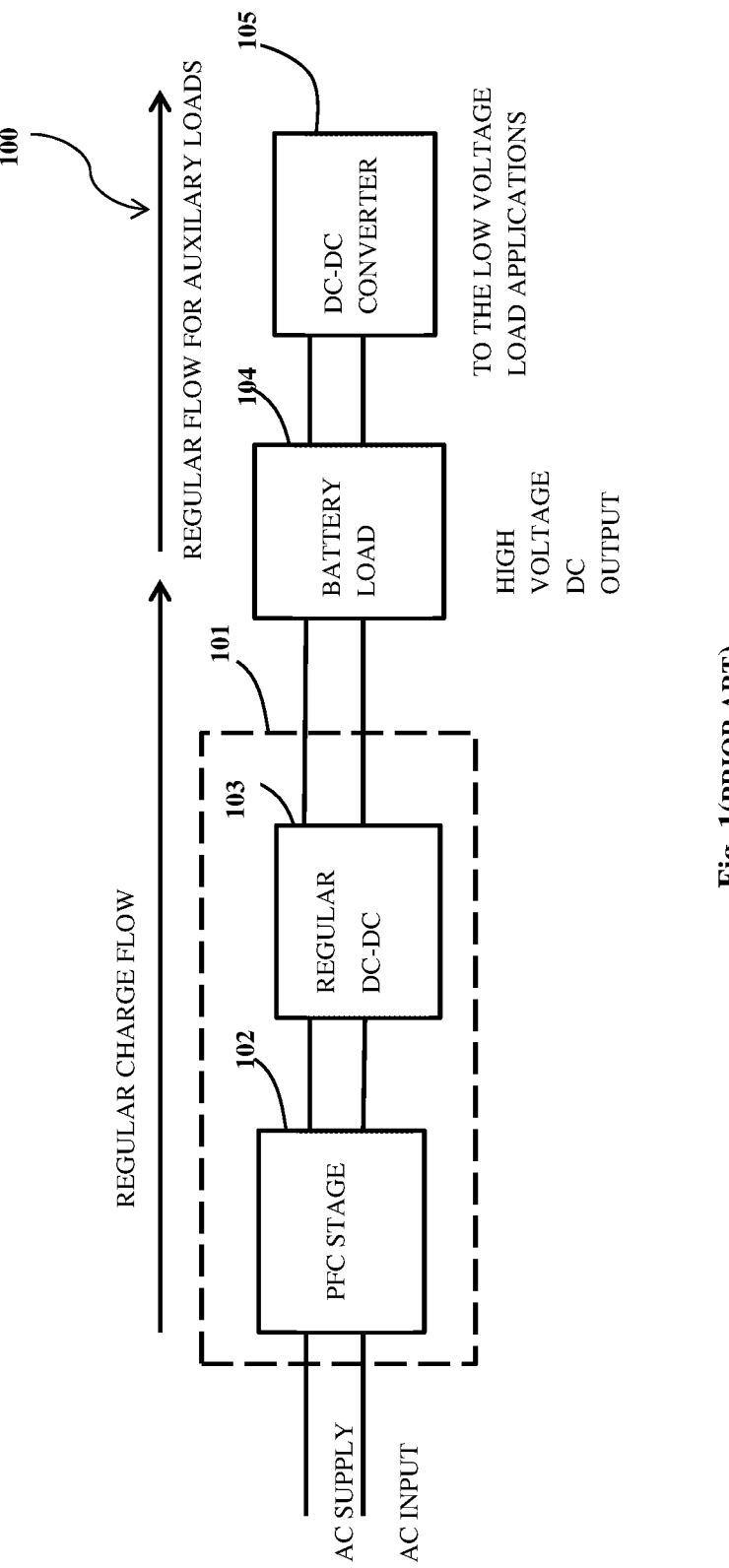
FIG. 1(Prior Art) exemplarily illustrates a block diagram of an existing implementation of a power supply system.

FIG. 1 (Prior Art) exemplarily illustrates a block diagram of an existing implementation of a power supply system 100 in a powered device In an embodiment, the powered device is an electric vehicle or a hybrid electric vehicle. Such a vehicle may have a power supply system 100 to drive the motor of the vehicle, to power electrical loads in the vehicle, to start the engine of the vehicle, etc. The power supply system 100 of the vehicle includes an on-board charger 101, one or more battery packs, such as, 104, one or more DC-DC converters 105, etc. The battery pack 104 may be rechargeable and charged using the on-board charger 101. The on-board charger 101 includes a rectifier, a power factor correction stage 102, and a DC-DC converter 103. The on-board charger 101 may be connected to an AC outlet that is in turn connected to an electric grid at charging stations. The rectifier converts the AC voltage to DC voltage. The power factor correction stage of the on-board charger corrects power factor to unity and regulates the input DC voltage to a standard DC voltage for the next stage. The DC-DC converter 103 in the on-board charger 101 adjusts the level of the DC voltage to the levels required by the battery pack 104 and charges the battery pack 104.

However, the DC-DC converter 103 is operational only on AC power supply and does not function during running condition of the vehicle. However, the low voltage loads, such as, the turn signal lamps, head light, horn, etc., need to be operated while the vehicle is in motion. Such low voltage loads require another DC/DC converter 105 to supply low voltage from the stored charge in the battery pack 104. The low voltage loads in the electric vehicle, such as, the turn signal lamps, head light, horn etc., are supplied current from the battery pack 104 via one or more DC/DC converters 105.

In an embodiment, the low voltage loads may be supplied from a low energy battery that is charged from the battery pack 104 in the vehicle via the DC/DC converter 105. The low energy battery may source the required current to the low voltage loads. The other set of DC/DC converters 105 are used to reduce voltage levels, leading to increase in number of parts in the vehicle, weight of the power supply system of the vehicle, resulting in space crunch in the vehicle, hindrance in assembly and serviceability of the vehicle, and increase in overall cost of the vehicle.

Thus, there exists a need for an improved & effective bi-directional DC-DC converter integrated with an on-board charger of a powered device, such as, the vehicle that functions during both the stationary condition and the running condition of the vehicle.

With the above objectives in view, the prevent invention discloses a bi-directional DC-DC converter that converts a first voltage to a second voltage in applications with combined powertrains for charging and discharging of energy storage devices.

It is an object of the invention to provide an on-board charger of a powered device, e.g. a vehicle with an integrated bi-directional DC-DC converter. As per an aspect of the present invention, the DC-DC converter is active during running condition of the vehicle and powers the low voltage electrical loads.

It is another objective of the invention to provide a bi-directional DC-DC converter in the charger of the powered device e.g. a vehicle with minimal heat dissipation in the power supply system.

Another objective of the invention is to provide a bi-directional DC-DC converter in the charger whose power level can be increased to cater for increased electrical loads in the powered device in future.

The present subject matter disclosed herein relates to a combined powertrain with a bi-directional DC-DC converter for charging and discharging of an energy storage device, for example, a battery pack in a powered device. More particularly, a bi-directional DC-DC converter integrated into an on-board charger of the powered unit is disclosed.

Figure 2:
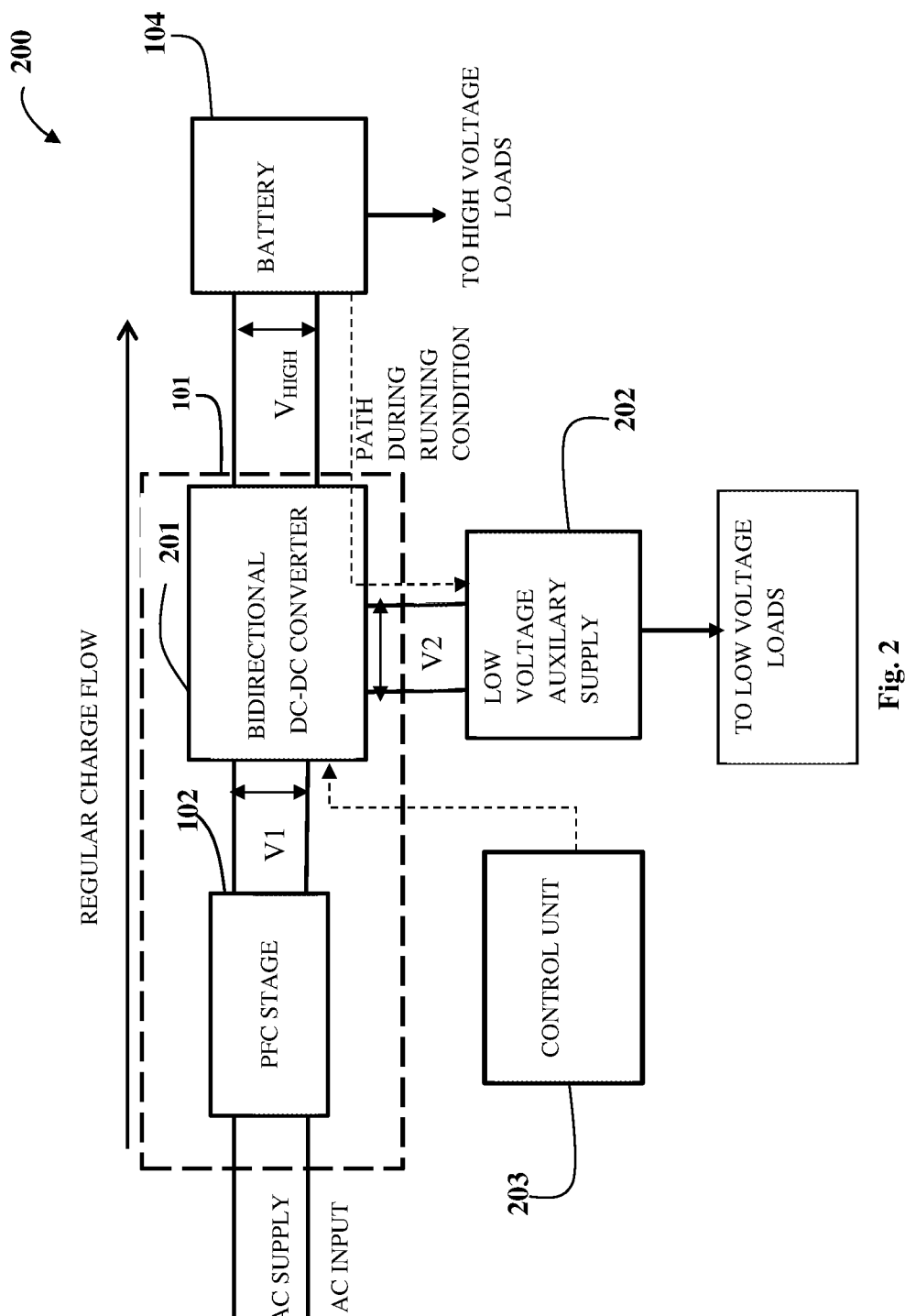
FIG. 2 exemplarily illustrates a block diagram of a power supply system, in accordance with an embodiment of the present invention.

In an embodiment, a bi-directional DC-DC converter for converting a first voltage to a second voltage is disclosed in FIG. 2. The bi-directional DC-DC converter comprises a primary circuit, a transformer, a high voltage power source, and a low voltage power source. The primary circuit electrically receives the first voltage, that is, the output of a power factor correction (PFC) stage. The transformer magnetically couples the primary circuit on a primary side with a rectification circuit on a secondary side. The high voltage power source is electrically connected to the rectification circuit for supplying a high voltage to one or more high voltage loads. The low voltage power source is electrically coupled to the high voltage power source through a secondary circuit for supplying a second voltage to one or more low voltage loads. The high voltage power source charges the low voltage power sources using the same components of the bi-directional DC-DC converter as disclosed in the detailed description of FIGS. 3A-3D and FIGS. 4A-4E.

In another embodiment of the present invention, an on-board charger of a powered device with a bi-directional DC-DC converter is disclosed as exemplarily illustrated in FIG. 2. The bi-directional DC-DC converter converts a first voltage to a second voltage to supply one or more high voltage loads and one or more low voltage loads. The bi-directional DC-DC converter is operational during a stationary condition and/or a running condition of the of the powered device.

FIG. 2 illustrates a block diagram of an exemplary implementation of a power supply system 200, in accordance with an embodiment of the present invention. The power supply system 200 of the powered device includes an on-board charger 101, one or more rechargeable battery pack 104, and a low voltage power source, that is, a secondary battery 202. The power supply system 200 illustrated is a combined circuit for charging of the battery pack 104 and discharging of the battery pack 104 towards charging of the secondary battery 202. The on-board charger 101 includes a rectifier, a power factor correction stage 102, and a bi-directional DC-DC converter 201. The on-board charger 101 may be connected to an AC outlet that is in turn connected to an electric grid at charging stations.

The rectifier converts the AC voltage to DC voltage and the power factor correction stage 102 corrects the power factor and regulates to the DC voltage to a standard DC voltage. The bi-directional DC-DC converter 201 adjusts the level of the DC voltage to the levels required by the battery pack 104 and charges the battery pack 104. The bi-directional DC-DC converter 201 converts the first voltage V1 to the second voltage V2. The first voltage V1 is the DC voltage output of the power factor correction stage 102. The second voltage V2 is the voltage of the secondary battery 202. The low voltage loads in the powered device like a vehicle are the turn signal lamps, the head light, the horn etc., are supplied current from the battery pack 104 via the same bi-directional DC-DC converter 201. While when the vehicle is in running condition, the bi-directional DC-DC converter 201 supplies low voltage from the battery pack 104. In the present invention, compared to the on-board charger 101, exemplarily illustrated in FIG. 1, the part count is reduced as the DC-DC converter 105 for supplying DC voltage to the low voltage electrical loads is completely eliminated & an improved dual load supply system is configured to meet the requirements in an efficient manner. In an embodiment, the bi-directional DC-DC converter 201 is integrated within the casing of the on-board charger 101 of the powered device. In an embodiment, the bi-directional DC-DC converter 201 is located outside the casing of the on-board charger 101. The operation of the bi-directional DC-DC converter 201 is controlled by a control unit 203 of the power supply system 200.

The two modes of operation of the bi-directional DC-DC converter 201 are as follows: Charging of the battery pack 104 from the DC voltage of the power factor correction stage 102 and charging of the secondary battery 202 by the charged battery pack 104. With respect to the embodiment of the present invention in a vehicle, the two modes of operation of the bi-directional DC-DC converter 201 are as follows: In stationary condition of the powered device, when the powered device is plugged for charging the battery pack 104, the bi-directional DC-DC converter 201 functions as the unidirectional DC-DC converter 105 incorporated in the on-board charger 101 to charge the battery pack 104. When the powered device is in the running condition or disconnected from a charging station, the bi-directional DC-DC converter 201 regulates the battery voltage from the battery pack 104 to a low voltage and stores in a low voltage or a secondary battery 202 to function as an auxiliary power supply. The secondary battery 202 supplies to the loads, such as, the LED head lamp, horn, side indicators, charging points for electronic devices, etc.

Thereby, using the power supply system 200, the number of parts is reduced and space required is reduced or optimized. Further, manufacturing cost of the overall power supply system 200 is reduced. Also, the heat generated by the additional DC-DC converter 105 is reduced and risk involved in the failure of the additional electrical and electronic components in the powered device is reduced with the removal of the additional DC-DC converter 105. Further, heat dissipation from the bi-directional DC-DC converter 201 integrated into the on-board charger 101 is taken care by the aluminium casing of the on-board charger 101, and additional heatsinks for cooling are avoided. The bi-directional DC-DC converter 201 may be configured for higher power levels to meet increased load demands in the powered device.

In an embodiment, the bi-directional DC-DC converter 201 comprises a primary circuit that receives a first voltage, that is, the output of the PFC stage 102. The first voltage on a primary side of a transformer is magnetically coupled to a rectification circuit on a secondary side. The battery pack 104 are electrically connected to the rectification circuit for charging the battery pack 104, and later supply to one or more high voltage loads, such as, a traction motor. The secondary battery 202 is electrically coupled to the battery pack 104 through a secondary circuit and the secondary battery 202 supplies the second voltage to the low voltage loads.

Figure 3A:
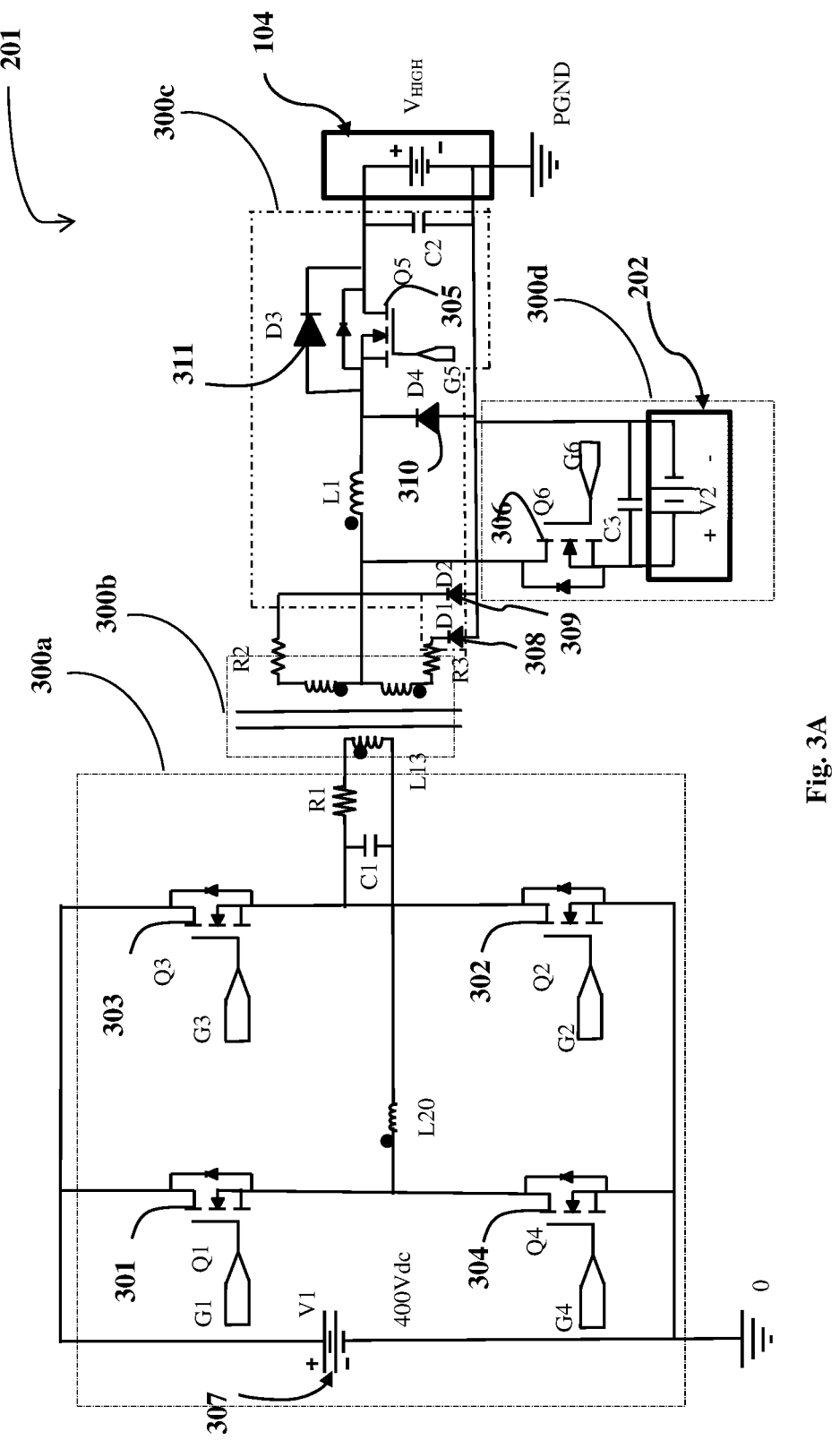
FIGS. 3A-3D exemplarily illustrate circuit diagrams of the bi-directional DC-DC converter, in accordance with an embodiment of the present invention.
Figure 3B:
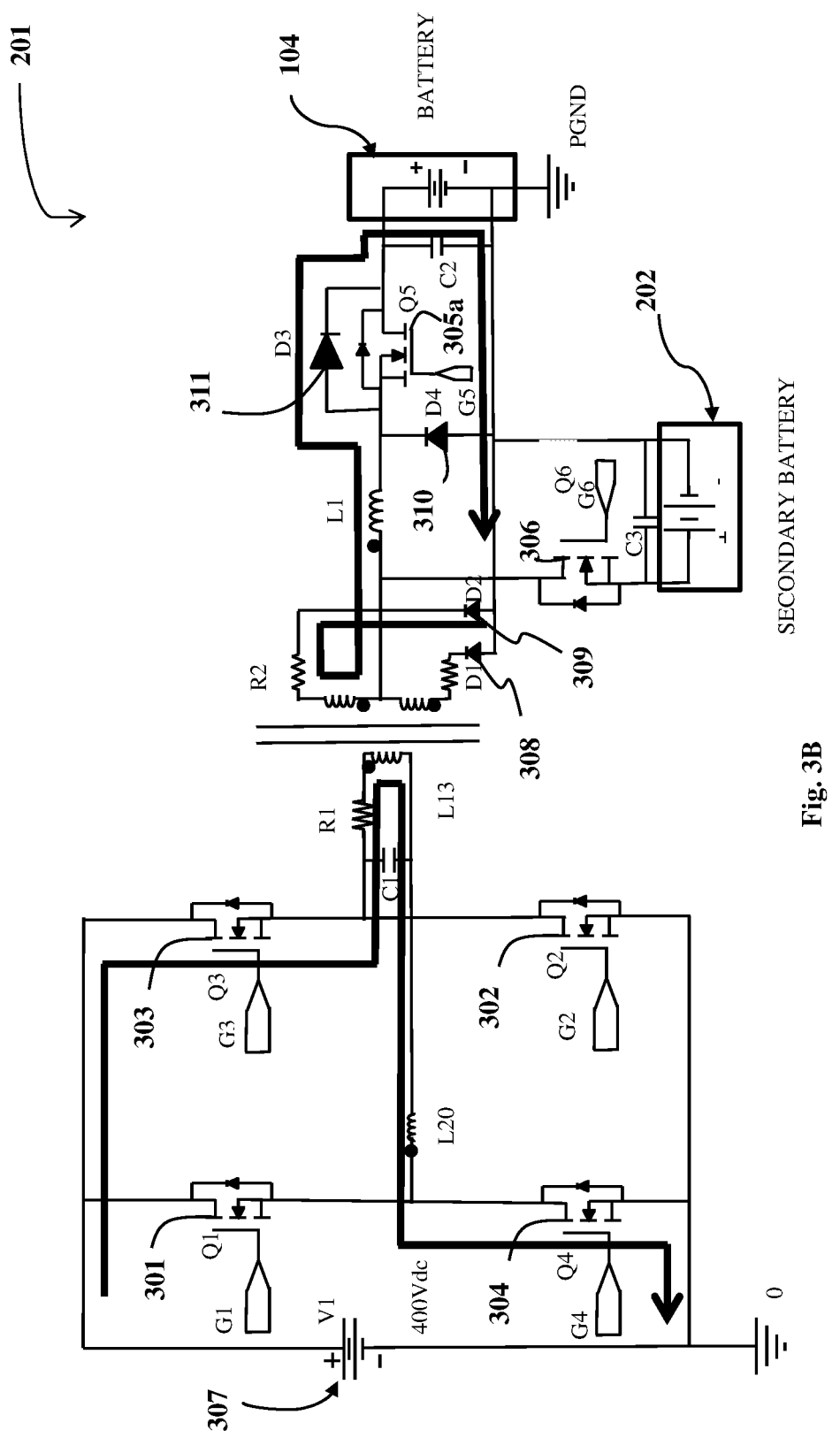
Figure 3C:
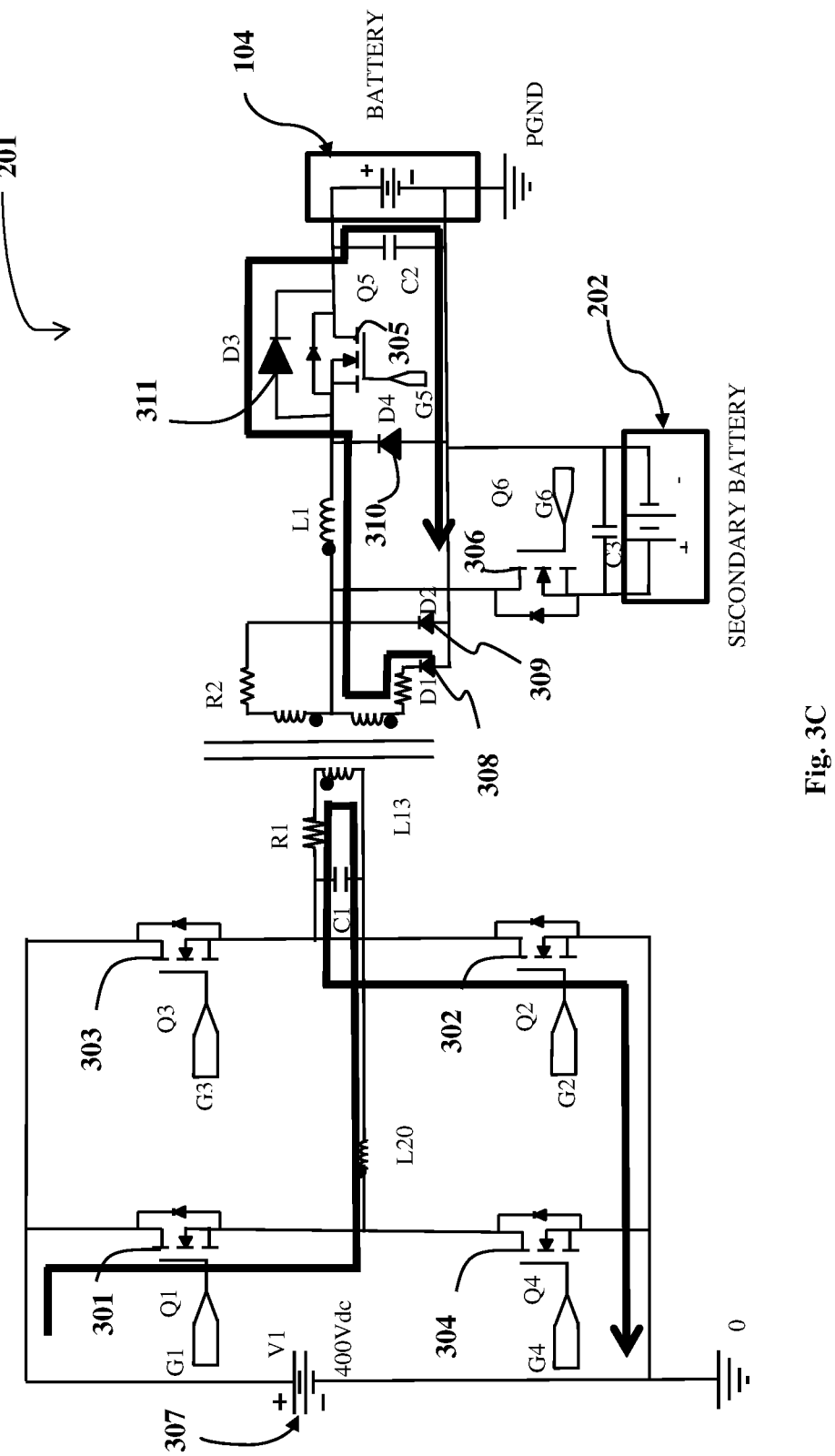
Figure 3D:
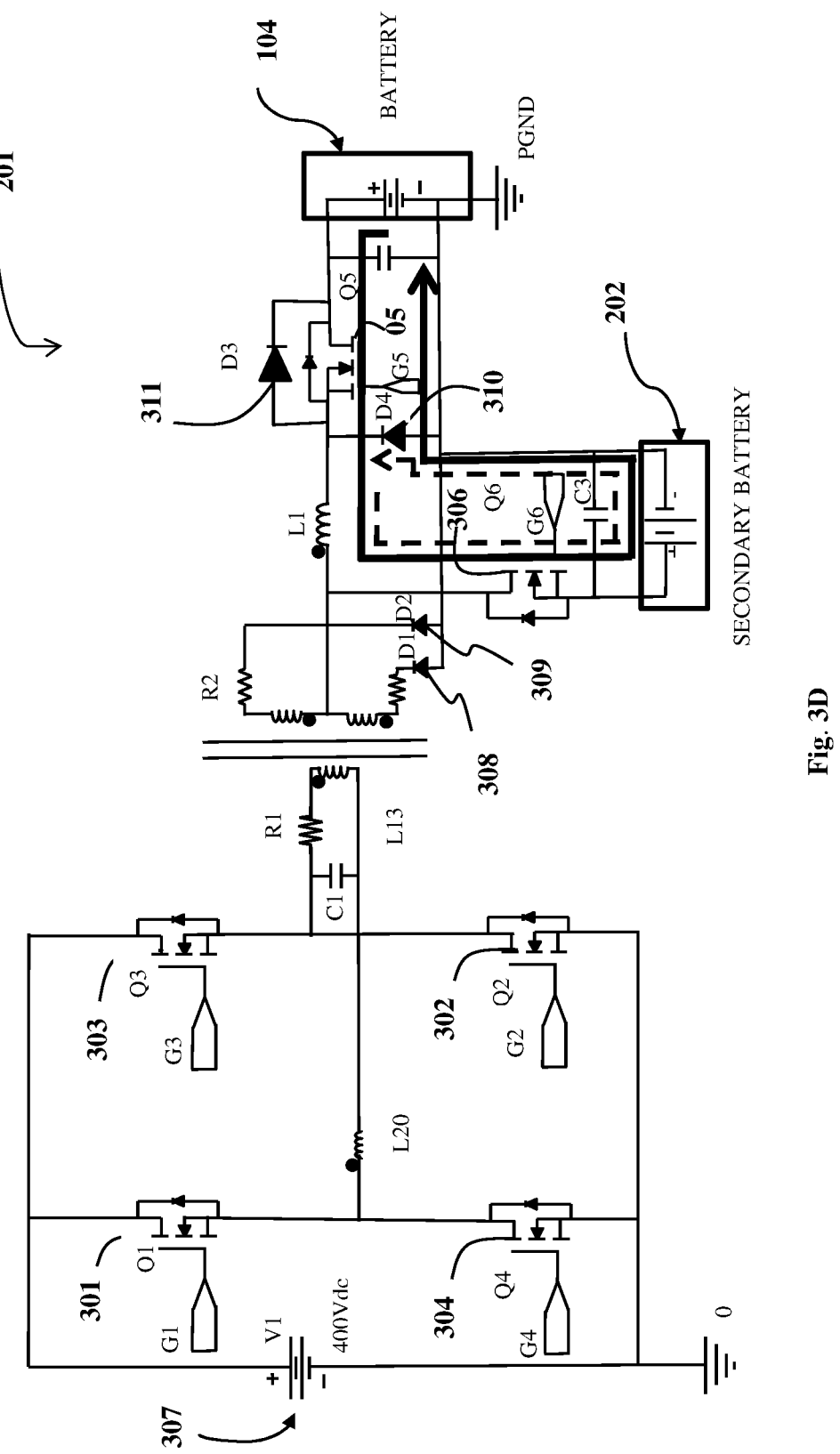
Figure 4A:
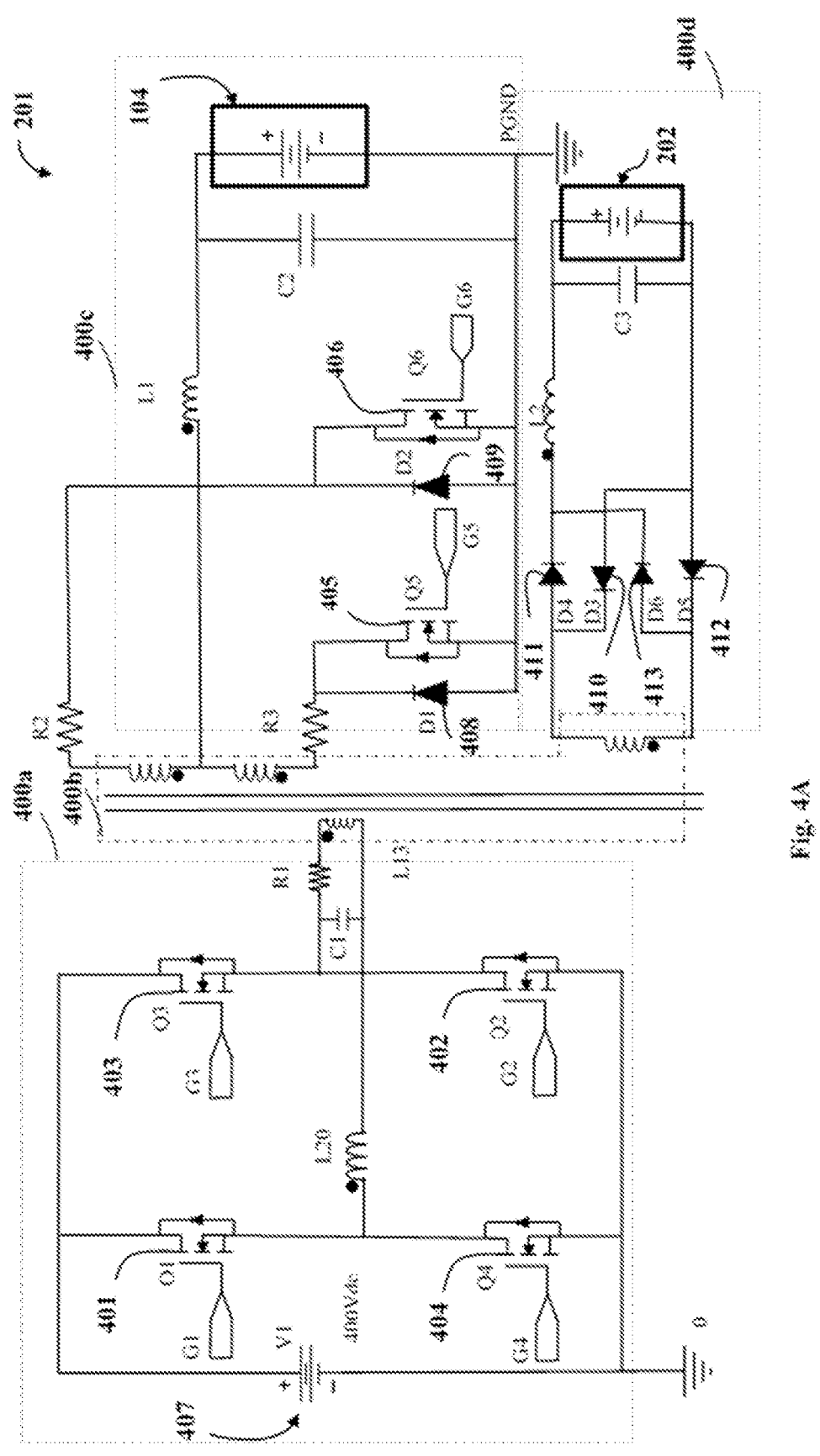
FIGS. 4A-4E exemplarily illustrate circuit diagrams of the bi-directional DC-DC converter, in accordance with another embodiment of the present invention.

In an embodiment, the bi-directional DC-DC converter 201 may be an isolated converter as exemplarily illustrated in FIG. 3A or a non-isolated converter as exemplarily illustrated in FIG. 4A. The detailed construction is provided in FIGS. 3B-3D and FIGS. 4B-4E respectively. The modes of operation of each embodiment of the bi-directional DC-DC converter 201 is provided in FIG. 6 and FIG. 7 respectively.

FIGS. 3A-3D exemplarily illustrate circuit diagrams of an embodiment of the bi-directional DC-DC converter 201 in a power supply system. The bi-directional DC-DC converter 201 is an isolated integrated buck converter that supplies low voltage to the auxiliary loads, such as, horn, instrument cluster, turn signal lamps, and head lamp through an auxiliary secondary battery 202, exemplarily illustrated in FIG. 2, during regular running condition. The primary circuit 300a electrically receives a first voltage V1, that is, the primary circuit is connected to the regulated voltage source V1 307. The transformer 300b magnetically couples the primary circuit 300a on the primary side with the rectification circuit 300c on the secondary side. The high voltage power source, that is, the battery pack 104 is electrically connected to the rectification circuit 300c for supplying high voltage, e.g., 48V to high voltage loads. The secondary battery 202 is electrically coupled to the battery pack 104 through the secondary circuit 300d for supplying a second voltage to the low voltage loads, such as, a horn, an instrument cluster, turn signal lamps, and a head lamp.

The primary circuit 300a of the bi-directional DC-DC converter 201 is a full bridge configuration of electronic switches MOSFETs Q1 301, Q2 302, Q3 303, and Q4 304. The rectification circuit 300c includes diodes D1 308, D2 309, D3 311, and D4 310 and a filter circuit including an inductor L1, C2, and Q5 305 connected to the battery pack 104. The primary circuit 300a is on the primary side of the transformer 300b and the rectification circuit 300c is on the secondary side of the transformer 300b. The rectification circuit 300c with the additional MOSFET Q5 305 and the diodes D3 311 and D4 310 perform synchronous rectification on the secondary side of the transformer 300b. A secondary circuit 300d includes a gating circuit, such as the MOSFET switch 306 that electrically connects the battery pack 104 to the secondary battery 202.

The modes of operation of the bi-directional DC-DC converter 201 are exemplarily illustrated in FIGS. 3B-3D. The operation of the MOSFETs Q1 301, Q2 302, Q3 303, and Q4 304 for respective switching periods is controlled by the control unit 203 of the on-board charger 101. The control unit 203 operates the MOSFETs Q1 301, Q2 302, Q3 303, and Q4 304 in PWM mode. The MOSFETs Q3 303 and Q4 304 are switched at 50% duty and 180 degrees out of phase with each other and the MOSFETs Q1 301 and Q2 302 are switched at 50% duty and 180 degrees out of phase with each other.

As exemplarily illustrated in FIG. 3B, during a first switching period, when MOSFETs Q3 303 and Q4 304 conduct, a positive voltage is applied to the dotted terminal of the primary winding of the transformer 300b. A secondary voltage with same positive polarity at dotted terminals of the secondary winding of the transformer 300b is generated. According to the polarity, the diode D2 309 in the secondary side of the transformer 300b is forward biased and current flows through the secondary side inductor L1 and diode D3 311 towards the battery pack 104 as exemplarily illustrated in FIG. 1. During this first switching period, the diode D4 310 is reverse biased and stays open circuited. The MOSFETs Q5 305 and Q6 are 306 open circuited, as the gating signal to Q5 305 and Q6 306 are not supplied by the control unit 203 of the power supply system 200. During the first switching period when the battery pack 104 is getting charged, gating signal to the MOSFETs Q5 305 and Q6 306 are not supplied by the control unit 203 and the circuit till the secondary battery 202 is isolated.

As exemplarily illustrated in FIG. 3C, during a second switching period when the MOSFETs Q1 301 and Q2 302 conduct, a negative voltage is applied to the dotted terminal of the transformer 300b. At dotted terminals of the secondary winding of the transformer 300b, a secondary voltage with same negative polarity is generated. According to the polarity, the diode D1 308 in the secondary side is forward biased and current flows through the secondary side inductor L1 and diode D3 311 towards the battery pack 104. During this second switching period, the diode D4 310 is reverse biased and stays open circuited. The MOSFETs Q5 305 and Q6 306 are also open circuited since gating signal from the control unit 203 of the on-board charger 101 is not provided. The battery pack 104 continues to charge during this duration. The MOSFETs Q1 301, Q2 302, Q3 303, and Q4 304 are operated at higher frequencies to charge the battery pack 104. During the first switching period and the second switching period, the vehicle is connected to the AC power supply and a regulated voltage is available as an input to the bi-directional DC-DC converter 201.

When the battery pack 104 discharges to charge the auxiliary secondary battery 202 via the bi-directional DC-DC converter, the mode exemplarily illustrated in FIG. 3D is active. With respect to the powered device, for example, the vehicle, when the vehicle is in running condition or in stationary condition and not plugged-in for charging, the mode exemplarily illustrated in FIG. 3D is active as the charging operation is not occurring. During this mode, the MOSFETs Q1 301, Q2 302, Q3 303, and Q4 304 are open circuited by not providing the gating signal. The MOSFET Q5 305 is the main buck switch, and the MOSFET Q6 306 is ON all the time during this mode by the control unit 203. During ON time of the switch Q5 305, current flows through the following viz. Battery pack—Q5—L1—Q6—secondary battery. The current flows from the battery pack 104 and charges the secondary battery 202 that powers the low voltage electrical and electronic loads in the vehicle. During OFF time of the switch Q5 305, current completes its path through L1—Q6—secondary battery—D4.

Thus, when there is isolation between the primary circuit with the MOSFETs Q1 301, Q2 302, Q3 303, and Q4 304 and the secondary circuit with the secondary battery 202, the battery pack 104 charges, while the secondary battery 202 is not charged by the full bridge configuration on the primary side of the transformer 300b. That is, when the powered device is plugged-in for charging, the battery pack 104 charges and supplies current to the electrical and electronic loads. When the powered device, that is, the vehicle is disconnected from charging, the battery pack 104 charges the secondary battery 202 and the secondary battery 202 supplies to the low voltage electrical and electronic loads in the vehicle. As a result of the present invention, the need for another DC-DC converter that down-converts the voltage of the battery pack 104 to supply to the low voltage electrical and electronic loads is eliminated. Therefore, the powered device (e.g. a vehicle) with one or more onboard energy storage devices like a battery pack 104 can be charged by connecting it to an external charger unit or can also be directly plugged into a conventional power supply point for further discharging viz. an improved bi-directional DC-DC charger 201.

FIGS. 4A-4E exemplarily illustrate circuit diagrams of an embodiment of the bi-directional DC-DC converter 201 integrated into the on-board charger 101 of the vehicle, in accordance with another embodiment of the present invention. The bi-directional DC-DC converter 201 as exemplarily illustrated in FIG. 4A is a non-isolated integrated buck converter that supplies the auxiliary loads, such as, a horn, an instrument cluster, turn signal lamps, and a head lamp through an auxiliary secondary battery 202 for regular vehicle running applications. The primary circuit 400a electrically receives a first voltage V1, that is, the primary circuit is connected to the regulated voltage source V1 407. The transformer 400b magnetically couples the primary circuit 400a on the primary side with the rectification circuit 400c on the secondary side. The high voltage power source, that is, the battery pack 104 is electrically connected to the rectification circuit 400c for supplying high voltage VHIGH, e.g. 48V to high voltage loads. The secondary battery 202 is electrically coupled to the battery pack 104 through the secondary circuit 400d for supplying a second voltage V2 to the low voltage loads, such as, a horn, an instrument cluster, turn signal lamps, and a head lamp.

The primary circuit 400a of the bi-directional DC-DC converter 201 is a full bridge center tapped transformer configuration of electronic switches MOSFETs Q1 401, Q2 402, Q3 403, and Q4 404 with an additional secondary winding. Such a configuration facilitates charging of secondary battery 202, as exemplarily illustrated in FIG. 2, while charging the main battery pack 104, as exemplarily illustrated in FIG. 2, as well as while not charging main battery pack 104. The rectification circuit 400c includes diodes D1 408, D2 409, a filter circuit including an inductor L1, C2, and switches Q5 405, and Q6 406 electrically connecting the secondary side of the transformer 400b to the battery pack 104. The primary circuit 400a is on the primary side of the transformer 400b and the rectification circuit 400c is on the secondary side of the transformer 400b. The secondary circuit 400d is also on the secondary side of the transformer 400b. The secondary circuit 400d comprises a bridge circuit magnetically coupled to the primary circuit 400a and the rectification circuit 400c.

The secondary circuit 400d comprises four additional diodes D3 410, D4 411, D5 412, and D6 413. In an embodiment, the diodes D3 410, D4 411, D5 412, and D6 413 may be replaced with controllable switches like MOSFETs for better controlling. The modes of operation of the bi-directional DC-DC converter 201 are exemplarily illustrated in FIGS. 4B-4D. The operation of the MOSFETs Q1 401, Q2 402, Q3 403, and Q4 404 for respective switching periods is controlled by the control unit 203 of the on-board charger 101. The control unit 203 operates the MOSFETs Q1 401, Q2 402, Q3 403, and Q4 404 in PWM mode.

Figure 4B:
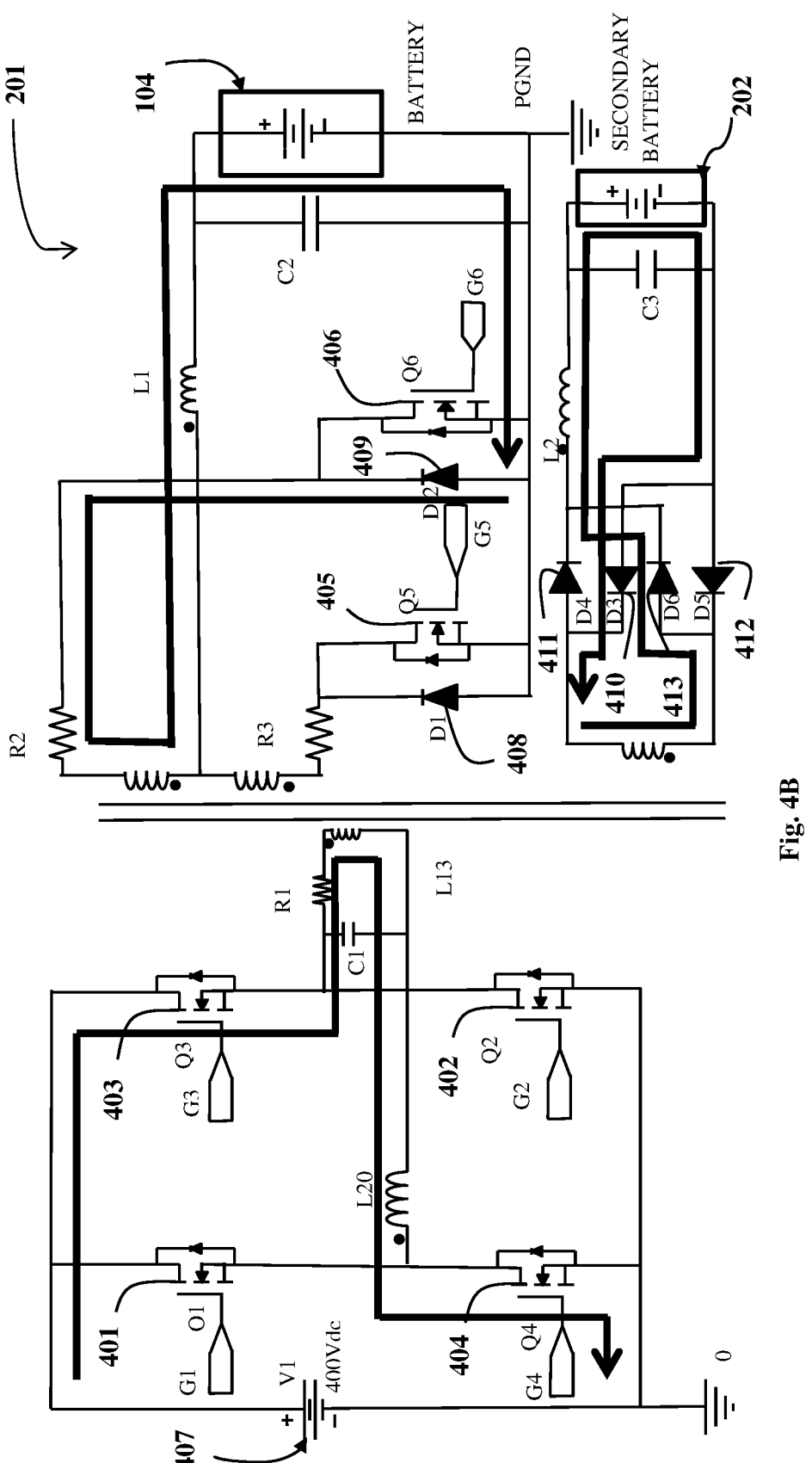

As exemplarily illustrated in FIG. 4B, the powered device is connected to the AC power supply and a regulated voltage V1 is available as an input to the bi-directional DC-DC converter 201. In this mode, the battery pack 104 and the secondary battery 202 charges using the regulated voltage V1 in this mode. The MOSFETs Q3 403 and Q4 404 are conducting when a gating signal is applied by the control unit 203. When the MOSFETs Q3 and Q4 are conducting, a positive voltage is applied to the dotted terminal of the transformer 400b, and same positive polarity applies at the dotted terminals of the secondary winding of the transformer 400b. According to the polarity, the diode D2 409 in the secondary side is forward biased and current flows through the secondary side inductor L1 to charge the battery pack 104. The dotted terminal of the additional third winding of the transformer 400b also sees voltage with positive polarity and the corresponding diodes D3 410 and D6 413 are forward biased and charge the secondary battery 202, till it reaches its 100% state of charge (SOC) and stops. The MOSFETs Q5 405 and Q6 406 are open circuited by not providing gating signal from the control unit 203 of the on-board charger 101.

Figure 4C:
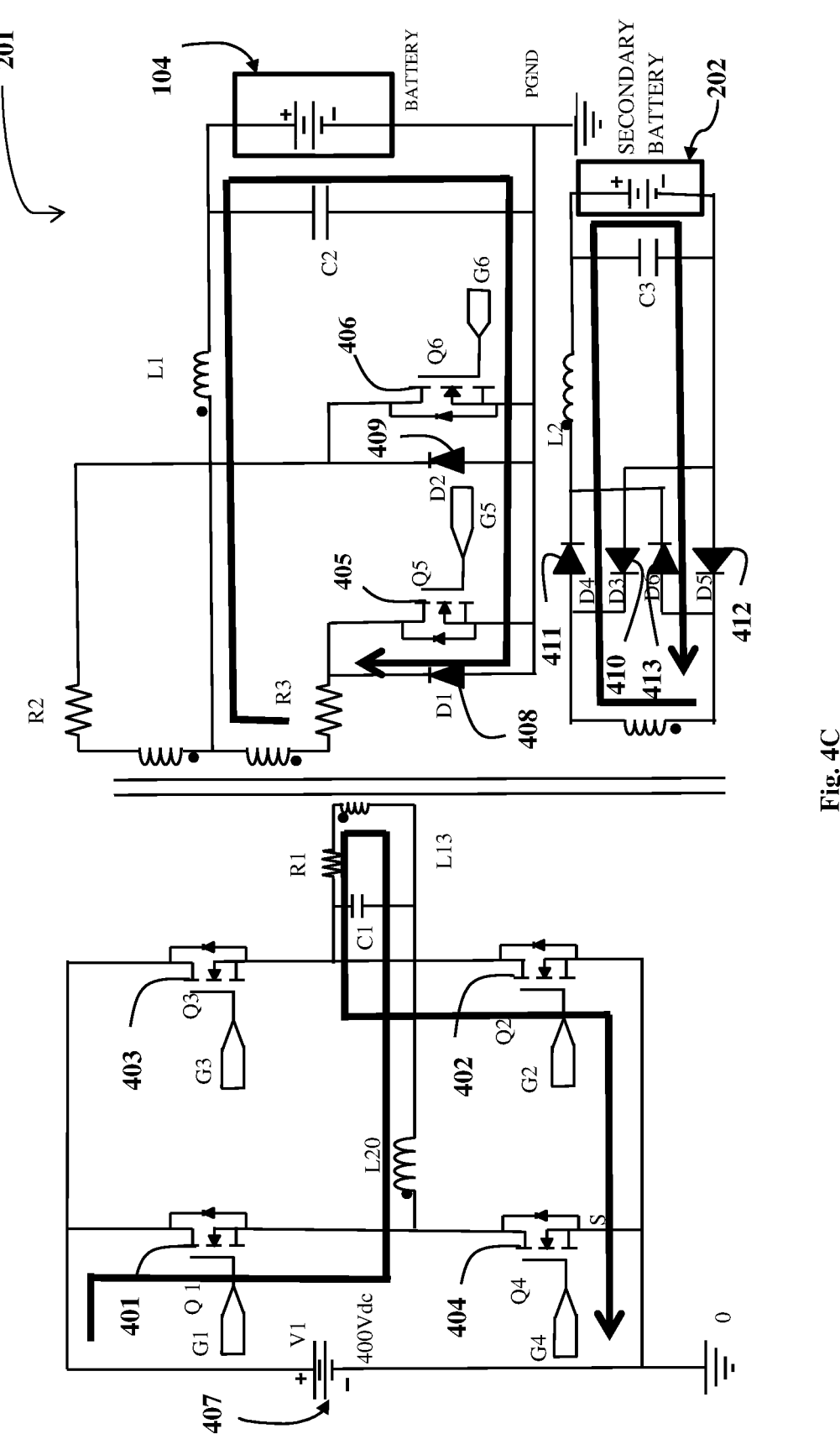

As exemplarily illustrated in FIG. 4C, the powered device is connected to the AC power supply and a regulated voltage V1 is available as an input to the bi-directional DC-DC converter 201. In this mode, the battery pack 104 and the secondary battery 202 charges using the regulated voltage V1 in this mode. The MOSFETs Q1 401 and Q2 402 are conducting when a gating signal is applied by the control unit 203. When the MOSFETs Q1 401 and Q2 402 are conducting, the dotted terminal of the transformer 400b as shown in FIG. 4C will see a voltage with negative polarity, and same negative polarity applies at dotted terminals of the secondary winding of the transformer 400b. According to the polarity, Diode D1 in the secondary side is forward biased and current flows through the secondary side inductor L1 to charge the battery pack 104. The dotted terminal of the third additional winding of the transformer 400b as shown in FIG. 4C also sees a voltage with negative polarity and the corresponding diodes D4 411 and D5 412 are forward biased and charge the secondary battery 202, till it reaches its 100% SOC and stops. The MOSFETs Q5 405 and Q6 406 are also open circuited by not supplying gating signal by the control unit 203.

Figure 4D:
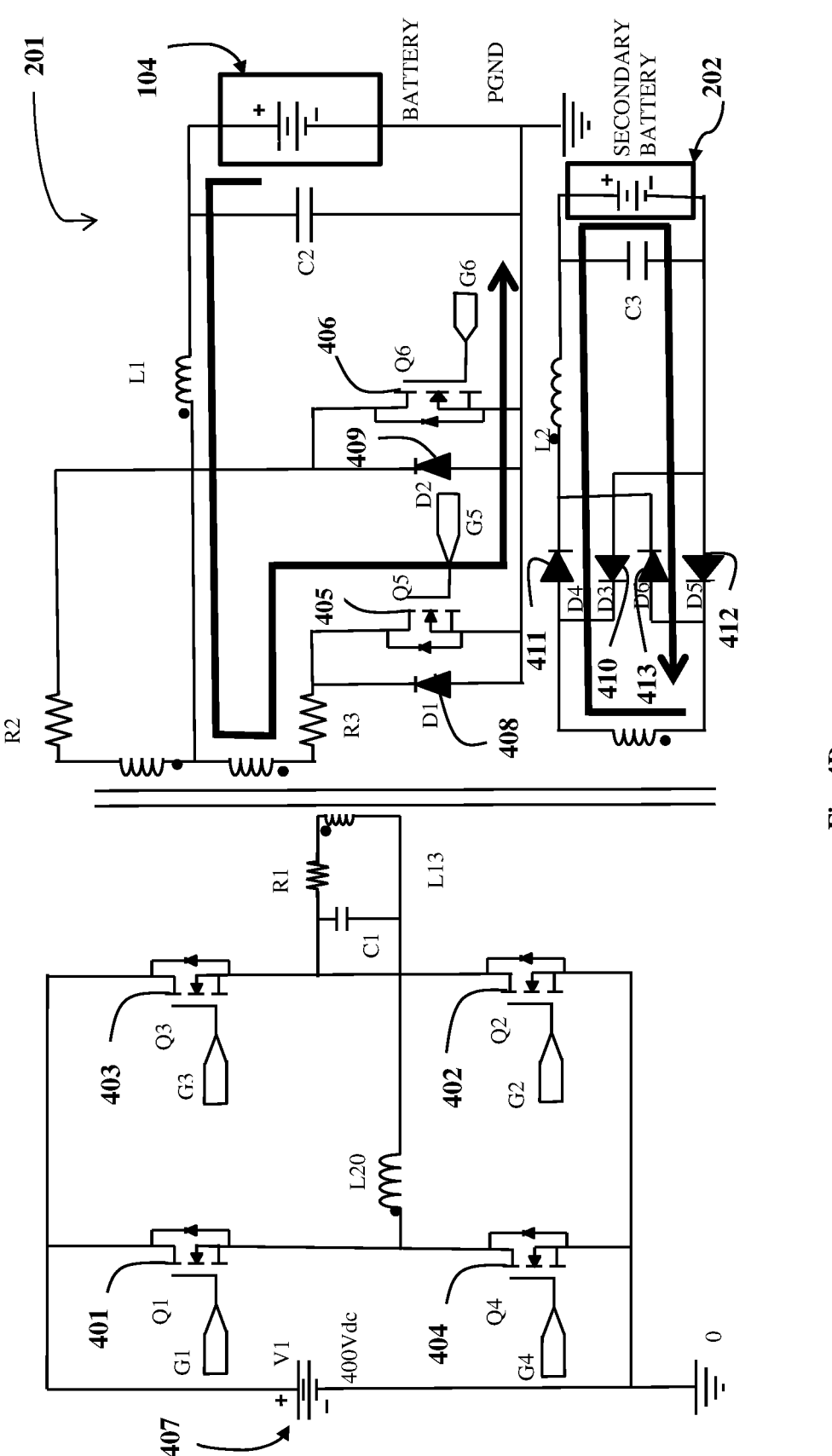

When the battery pack 104 discharges to charge the secondary battery 202 via the bi-directional DC-DC converter 201, the mode exemplarily illustrated in FIG. 4D is active. With respect to the powered device, for example, the vehicle, when the vehicle is in running condition or the vehicle is in stationary condition and not charging, the mode exemplarily illustrated in FIG. 4D is active. In this mode, the bi-directional DC-DC converter 201 functions as a push-pull converter by using the main battery pack 104 as a source of power. In this mode, the MOSFET Q5 405 is turned ON by the control unit 203 and current flows in the path viz. Battery—L1—Q5. The current flow creates negative polarity at a dotted terminal of the corresponding secondary winding of transformer 400*b*. Further, voltage with negative polarity is generated at all the other dotted terminals. The third additional winding of the transformer 400*b* forward biases the diodes D4 411 and D5 412 and current flows to the secondary battery in the path: D4—secondary battery—D5. During this time, the MOSFETs Q1 401, Q2 402, Q3 403, and Q4 404 are open circuited by not supplying the gating signal.

Figure 4E:
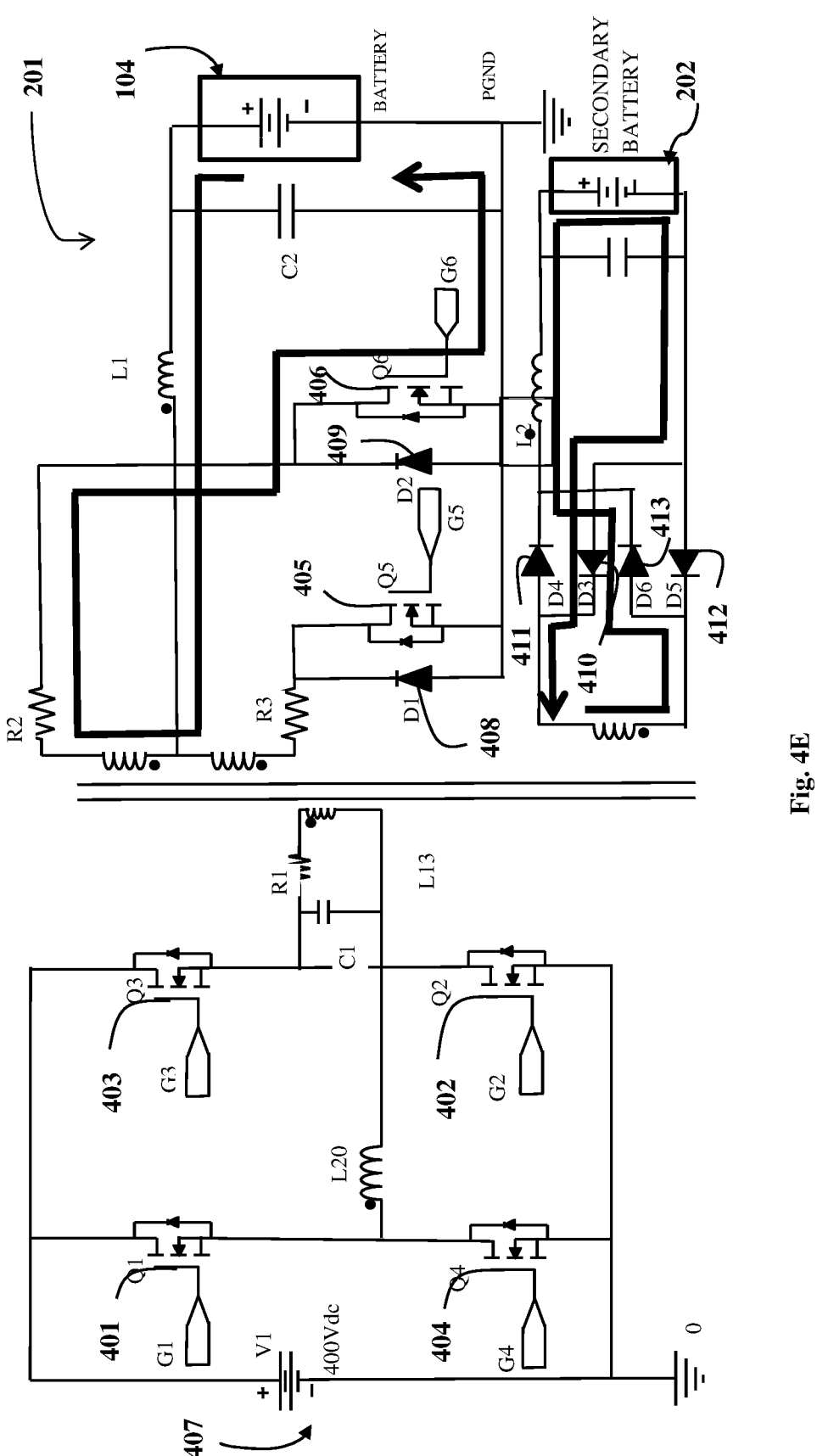

When the powered device is in running condition or in stationary condition and not charging, the mode exemplarily illustrated in FIG. 4E is active. In this mode, the DC-DC converter 201 functions as a push-pull converter by using main battery pack 104 as a source of power. In this mode, the MOSFET Q6 406 is turned ON by the control unit 203 and current flows in the path defined by Battery—L1—Q6. The current flow creates positive polarity at a dotted terminal of the corresponding secondary winding of transformer 400*b*, thereby creating a positive polarity at all other dotted terminals. The third additional winding of the transformer 400*b* forward biases the diodes D3 410 and D6 413 and current flows to the secondary battery 202 in the path viz. D6—secondary battery—D3. The current flow charges the secondary battery 202 that powers the low voltage electrical and electronic loads in the vehicle. During this time the MOSFETs Q1 401, Q2 402, Q3 403, and Q4 404 are open circuited by not providing the gating signal. Thus, the battery pack 104 for traction and the secondary battery 202 for the low voltage loads both are charged by the full bridge configuration of the MOSFETs Q1 401, Q2 402, Q3 403, and Q4 404 of the primary circuit 400*a*.

The bi-directional DC-DC converter 201 exemplarily illustrated in FIGS. 3A and 4A facilitates the charging of the secondary battery 202 using the DC current and the secondary battery 202 powers the low voltage electrical and electronic loads in the powered device, in the running condition and/or stationary condition of the powered device as described above.

FIG. 5 exemplarily illustrates a flowchart depicting a method for converting a first voltage to a second voltage in an on-board charger 101. At step 501, a control unit 203 and a bi-directional DC-DC converter 201 as exemplarily illustrated in FIGS. 3A and 4A are connected. The control unit 203 at step 502 determines availability of the first voltage. Based on the availability of the first voltage, the control unit 203 at step 503 senses battery parameters of the high voltage power source, that is, the battery pack 104 and the low voltage power source, that is, the secondary battery 202. Based on the sensed battery parameters, the control unit 203 at step 504 applies a gating signal to the components of the primary circuit 300*a* or 400*a*, the rectification circuit 300*c* or 400*c*, and the secondary circuit 300*d* or 400*d* for converting the first voltage V1 to the high voltage VHIGH and the second voltage V2 as disclosed in the detailed description of FIG. 6 and FIG. 7.

Figure 6:
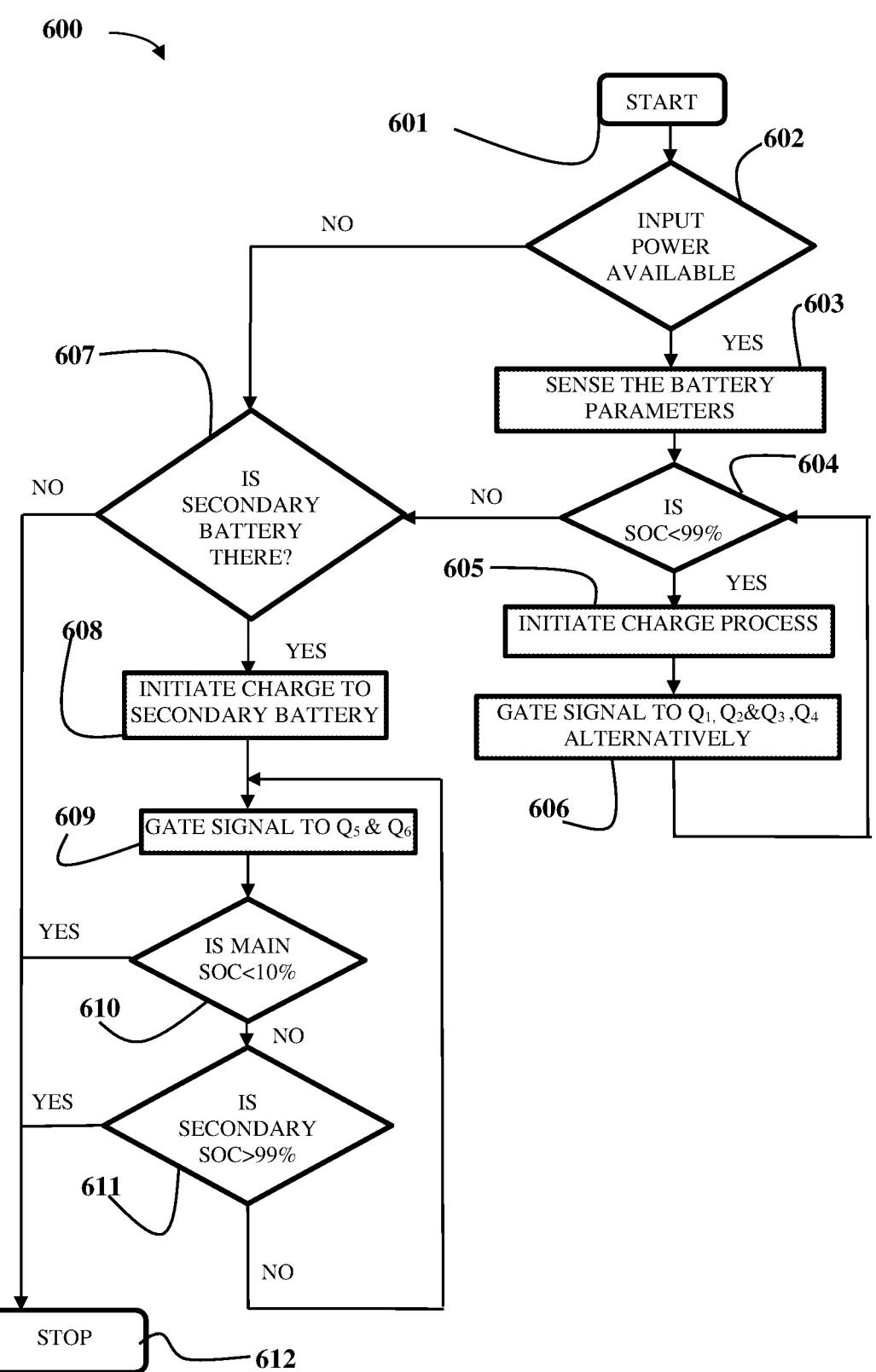
FIG. 6 exemplarily illustrates a flowchart depicting steps of operation of the bi-directional DC-DC converter, in accordance with an embodiment of the present invention.

For converting the first voltage V1 to the high voltage VHIGH as exemplarily illustrated in FIG. 6, the control unit 203 applies the gating signal to the primary circuit 300*a* based on the sensed battery parameters of the high voltage power source 104. Further, for converting the high voltage VHIGH to the second voltage V2 comprises determining availability of the low voltage power source 202 and applying the gating signal to the rectification circuit 300*c* and the secondary circuit 300*d*, based on sensed battery parameters of the high voltage power source 104 and the low voltage power source 202.

Figure 7:
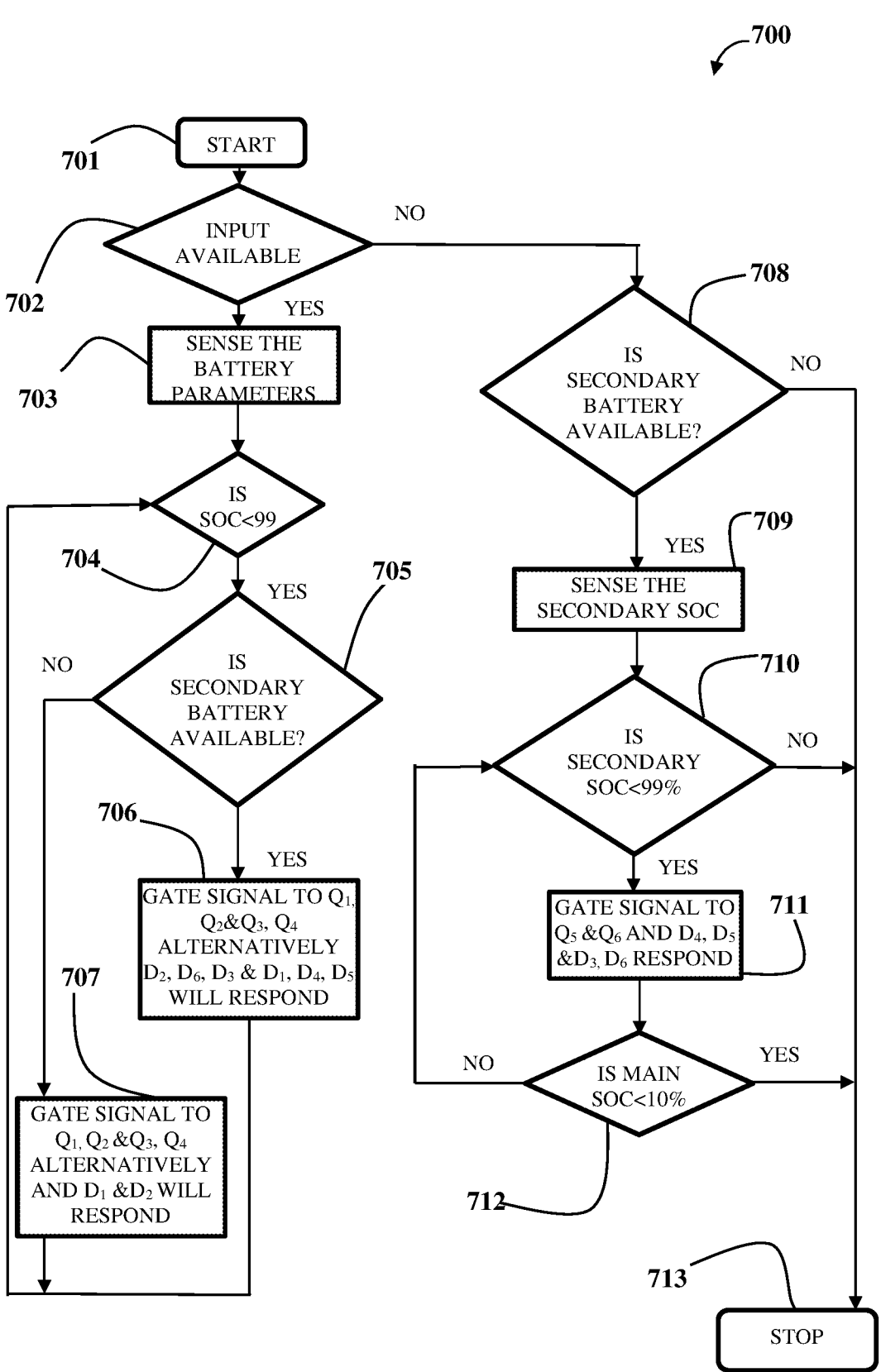
FIG. 7 exemplarily illustrates a flowchart depicting steps of operation of the bi-directional DC-DC converter, in accordance with another embodiment of the present invention.

For converting the first voltage V1 to the high voltage VHIGH based on the sensed battery parameters of the high voltage power source 104 as exemplarily illustrated in FIG. 7, the control unit 203 determines availability of the low voltage power source 202. Further, the control unit 203 applies the gating signal to the primary circuit 400*a*, the rectification circuit 400*c*, and the secondary circuit 400*d*. Further, for converting the high voltage VHIGH to the second voltage V2, the control unit 203 determines availability of the low voltage power source 202 and applies the gating signal to the rectification circuit 400*c* and the secondary circuit 400*d*, based on the sensed battery parameters of the high voltage power source 104 and the low voltage power source 202.

FIG. 6 exemplarily illustrates a flowchart showing steps for converting a first voltage to a second voltage by an embodiment of the bi-directional DC-DC converter 201 exemplarily illustrated in FIG. 3A. The control unit 203 of the on-board charger at step 602 determines if input power to the bi-directional DC-DC converter 201 is available. If the input power is available, the control unit 203 at step 603 senses the parameters of the battery pack 104. The control unit 203 at step 604 determines if the state of charge (SOC) of the battery pack 104 is less than 99%, that means the battery pack 104 needs to be charged. The control unit 203 at step 605 initiates charging process of the battery pack 104. The control unit 203 at step 606 provides gating signals to the MOSFETs Q1 301, Q2 302, Q3 303, and Q4 304 alternatively as described in the detailed description of FIGS. 3A-3D. The control unit 203 again determines if the SOC of the battery pack 104 is greater than 99% and indicates the charging of the battery pack 104 is complete.

Once the charging of the battery pack 104 is complete, the battery pack 104 can discharge and charge a secondary battery 202. The control unit 203 at step 607 determines if a secondary battery 202 is available. If the secondary battery 202 is available, the control unit 203 at step 608 initiates charging of the secondary battery 202. The control unit 203 then at step 609 provides a gating signal to Q5 305 and Q6 306 as described in the detailed description of FIGS. 3A-3D. During the process, the control unit 203 at step 610 determines if the SOC of the battery pack 104 is less than 10%. If incase this is true, the control unit 203 disrupts the discharging of the battery pack 104 and initiates the charging of the battery pack 104. If the SOC of the battery pack 104 is not less than 10%, the control unit 203 at step 611 determines if the SOC of the secondary battery 202 is greater than 99%. If true, the control unit 203 stops the charging of the secondary battery 202. If false, the control unit 203 continues the charging of the secondary battery 202 from the battery pack 104 via the MOSFETs Q5 305 and Q6 306.

FIG. 7 exemplarily illustrates a flowchart showing steps for converting a first voltage to a second voltage by an embodiment of the bi-directional DC-DC converter 201 exemplarily illustrated in FIG. 4A. The control unit 203 at step 702 determines if input power, that is, V1 407 to the bi-directional DC-DC converter 201 is available. If the input power, that is V1 407 is available, the control unit 203 at step 703 senses the parameters of the battery pack 104. The control unit 203 at step 704 determines if the state of charge (SOC) of the battery pack 104 is less than 99%, that means the battery pack needs to be charged. If yes, the control unit 203 at step 705 determines if a secondary battery 202 is available.

If the secondary battery 202 is available, the control unit 203 initiates charging of the battery pack 104 and the secondary battery 202. The control unit 203 at step 706 provides gating signals to the MOSFETs Q1 401, Q2 402 and Q3 403, and Q4 404 alternatively as disclosed in the detailed description of FIGS. 4A-4E. Accordingly, the diodes D2 409, D6 413, D3 410, and diodes D1 408, D4 411, and D5 412 are forward biased and reverse biased. If the secondary battery 202 is not available, the control unit 203 at step 706 provides gating signals to the MOSFETs Q1 401, Q2 402 and Q3 403, and Q4 404 alternatively and only the diodes D1 408 and D2 409 will be forward biased and reverse biased accordingly.

However, if the input power, that is V1 407 is not available, the control unit at step 708 provides if the secondary battery 202 is available. If the secondary battery 202 is available, the control unit at step 709 senses the parameters of the secondary battery 202. The control unit 203 at step 710 determines if the state of charge (SOC) of the secondary battery 202 is less than 99%, that means the secondary battery 202 needs to be charged. If yes, the control unit 203 initiates charging of the secondary battery 202 from the battery pack 104. The control unit 203 at step 711 provides a gating signal to Q5 405 and Q6 406 as described in the detailed description of FIGS. 3A-3D and the diodes D4 410, D5 413 and D3 411, D6 412 will be forward biased or reverse biased accordingly. During the process, the control unit 203 at step 712 determines if the SOC of the battery pack 104 is less than 10%. If incase this is true, the control unit 203 disrupts the discharging of the battery pack 104 and initiates the charging of the battery pack 104. If the SOC of the battery pack 104 is not less than 10%, the control unit 203 at step 710 determines if the SOC of the secondary battery 202 is not less than 99%. If true, the control unit 203 stops the charging of the secondary battery 202. If false, the control unit 203 continues the charging of the secondary battery 202 from the battery pack 104 via the MOSFETs Q5 405 and Q6 406.

Improvements and modifications may be incorporated herein without deviating from the scope of the invention.

We claim:

1. A bi-directional DC-DC converter for converting a first voltage to a second voltage, comprising:
   a primary circuit electrically receiving a first voltage;
   a transformer for magnetically coupling the primary circuit on a primary side with a rectification circuit on a secondary side;
   a high voltage power source electrically connected to the rectification circuit for supplying a high voltage to one or more high voltage loads; and
   a low voltage power source electrically coupled to the high voltage power source through a secondary circuit for supplying a second voltage to one or more low voltage loads,
   wherein the rectification circuit comprises a plurality of diodes,
   wherein a filter circuit electrically connects the secondary side of the transformer to the high voltage power source, and
   wherein the secondary circuit comprises at least one of:
      a gating circuit electrically connecting the high voltage power source to the low voltage power source; and
      a bridge circuit magnetically coupled to the primary circuit and the rectification circuit.

2. The bi-directional DC-DC converter of claim 1, wherein the rectification circuit further comprises a plurality of switches, and wherein the bridge circuit of the secondary circuit electrically connects the high voltage power source to the low voltage power source.

3. The bi-directional DC-DC converter of claim 1, wherein the primary circuit comprises a full bridge configuration of switches electrically connected to a DC voltage source.

4. The bi-directional DC-DC converter of claim 1, wherein a control unit controls the primary circuit, the rectification circuit, and the secondary circuit for one of connecting and disconnecting the low voltage power source from the high voltage power source, based on battery parameters of the low voltage power source and the high voltage power source.

5. The bi-directional DC-DC converter of claim 1,
   wherein the bi-directional DC-DC converter is employed in an on-board charger of a powered device, and
   wherein the bi-directional DC-DC converter is operational during at least one of a stationary condition of the powered device and a running condition of the powered device.

6. The bi-directional DC-DC converter of claim 5,
   wherein the on-board charger, further comprises a rectifier electrically connected to an AC power supply for converting a AC power supply voltage to a DC voltage, and
   wherein a power factor correction stage electrically connected to the rectifier for generating the first voltage from the DC voltage.

7. A method of converting a first voltage to a second voltage in an on-board charger comprises:
   connecting a control unit and a bi-directional DC-DC converter, the bi-directional DC-DC converter comprising:
      a primary circuit configured to electrically receive a first voltage;
      a transformer configured to magnetically couple the primary circuit on a primary side with a rectification circuit on a secondary side;
      a high voltage power source configured to electrically connect to the rectification circuit for supplying a high voltage to one or more high voltage loads; and
      a low voltage power source configured to electrically couple to the high voltage power source through a secondary circuit for supplying a second voltage to one or more low voltage loads,
   determining availability of the first voltage by the control unit;
   sensing battery parameters of the high voltage power source and the low voltage power source by the control unit, based on the availability of the first voltage; and
   applying a gating signal by the control unit to one or more of the primary circuit, the rectification circuit, and the secondary circuit, based on the sensed battery parameters, for converting the first voltage to the high voltage and the second voltage.

8. The method of claim 7,
   wherein for converting the first voltage to the high voltage comprises applying the gating signal to the primary circuit based on the sensed battery parameters of the high voltage power source, and
   wherein for converting the high voltage to the second voltage comprises determining availability of the low voltage power source and applying the gating signal to the rectification circuit and the secondary circuit, based on the sensed battery parameters of the high voltage power source and the low voltage power source.

9. The method of claim 7, wherein for converting the first voltage to the high voltage based on the sensed battery parameters of the high voltage power source comprises determining availability of the low voltage power source and applying the gating signal to the primary circuit, the rectification circuit, and the secondary circuit, and wherein for converting the high voltage to the second voltage comprises determining availability of the low voltage power source and applying the gating signal to the rectification circuit and the secondary circuit, based on the sensed battery parameters of the high voltage power source and the low voltage power source.

\* \* \* \* \*